(12) United States Patent
Tokkonen

(10) Patent No.: US 7,973,770 B2
(45) Date of Patent: Jul. 5, 2011

(54) METHOD AND USER INTERFACE FOR ENTERING CHARACTERS

(75) Inventor: Timo Tokkonen, Oulu (FI)

(73) Assignee: Nokia Corporation, Espoo (FI)

(*) Notice: Subject to any disclaimer, the term of this patent is extended or adjusted under 35 U.S.C. 154(b) by 1036 days.

(21) Appl. No.: 11/132,479

(22) Filed: May 19, 2005

(65) Prior Publication Data

US 2005/0270269 A1 Dec. 8, 2005

Related U.S. Application Data

(63) Continuation of application No. PCT/FI03/00889, filed on Nov. 19, 2003.

(30) Foreign Application Priority Data

Nov. 20, 2002 (EP) .................................... 02102606

(51) Int. Cl.
 *G06F 3/041* (2006.01)
 *G06F 3/048* (2006.01)
(52) U.S. Cl. ....................................... 345/173; 715/773
(58) Field of Classification Search .................. 345/156, 345/173, 179, 82–100; 715/780, 810, 812, 715/834, 864; 178/18.01; 340/407.1
 See application file for complete search history.

(56) References Cited

U.S. PATENT DOCUMENTS

| 5,805,167 | A | 9/1998 | Van Cruyningen |
| 6,011,542 | A * | 1/2000 | Durrani et al. ................ 345/156 |
| 6,337,698 | B1 | 1/2002 | Keely, Jr. et al. |
| 6,741,235 | B1 * | 5/2004 | Goren ............................ 345/173 |
| 6,801,190 | B1 * | 10/2004 | Robinson et al. ............. 345/173 |
| 7,145,554 | B2 * | 12/2006 | Bachmann ..................... 345/173 |
| 2004/0095393 | A1 * | 5/2004 | Anson ........................... 345/773 |

FOREIGN PATENT DOCUMENTS

| WO | WO 96/39670 | 12/1996 |
| WO | WO 99/27435 | 3/1999 |

* cited by examiner

*Primary Examiner* — Kevin M Nguyen
*Assistant Examiner* — Kenneth B Lee, Jr.
(74) *Attorney, Agent, or Firm* — Hollingsworth & Funk, LLC

(57) ABSTRACT

The invention relates to a method for entering characters in a user interface of an electronic device. The method according to the invention comprises: detecting the direction of movement indicated by the input device when the start of the character entering function has been detected; showing the character of the character area on the display, towards which character area the direction of movement indicated by the input device is proceeding; detecting the termination of the character entering function; interpreting the character towards whose character area the direction of movement was last detected to proceed as the character to be entered next, when the termination of the character entering function is detected.

20 Claims, 3 Drawing Sheets

METHOD AND USER INTERFACE FOR ENTERING CHARACTERS

CROSS-REFERENCES TO RELATED APPLICATIONS

Figure 1:
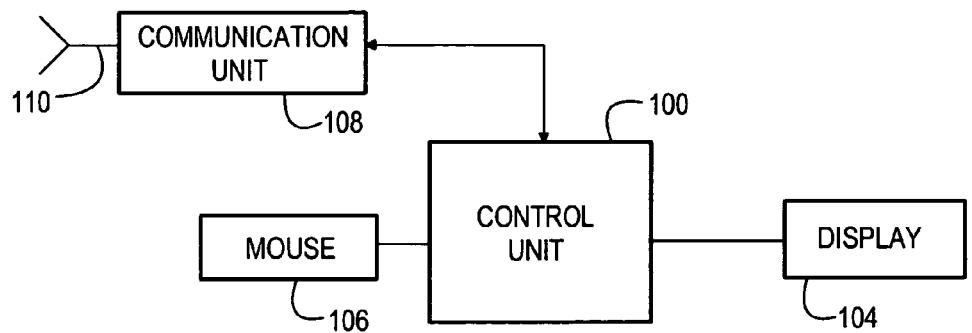

This application is a continuation of International Application PCT/FI2003/000889, with an international filing date of 19 Nov. 2003, which designated the U.S. and which is incorporated herein by reference in its entirety.

FIELD

The invention relates to a method for entering characters in a user interface of an electronic device, and a user interface of an electronic device.

BACKGROUND

Electronic devices, such as mobile telephones, are continuously reduced in size. A special problem in the usage of an electronic device is the entering of text. Eventually the keypad used in electronic devices, such as a character keypad, becomes impracticable, because it is difficult for the user of the device to press extremely small keys. Since separate keypads in the devices increase the size of the devices, small electronic devices with only a touch screen as the user interface have become common. In electronic devices, touch screens are often used to replace the mouse and the keypad, for example. The user gives control commands to the device by touching contact areas visible on the touch screen.

Several portable devices are provided with a feature that identifies handwriting, by means of which the device converts handwritten text, for example, into composed text. There are different automatic identification methods of handwritten symbols in which the characters of the entered text are written directly on the touch screen. The user writes characters in an area for writing characters on a touch screen by means of a pen or a finger, for example. The device then identifies the written character based on the detected contact points in said area. Also some text entry systems have been proposed, wherein the characters visible on the touch screen of an electronic device are selected by sliding a pen or a finger over the character to be entered.

The current text entry systems, such as handwriting or speech recognition systems, are often slow and error prone. Also in the handwriting systems the area reserved on the touch screen for writing characters is small, which makes it hard to write in said area in a moving vehicle, for example. If the selection of the characters is conducted by sliding a pen over the desired character visible on the touch screen, it is difficult to hit the correct character when, for example, the writer's hand shakes in a rush hour bus.

BRIEF DESCRIPTION OF THE INVENTION

It is an object of the invention to provide a method and a user interface so as to alleviate prior art problems. This is achieved by a method for entering characters in a user interface of an electronic device, the user interface comprising: a display and an input device, the method comprising: predetermining a given character area on the display for each character, which character areas are in relation with each other in order to achieve a given character area pattern; detecting a start of a character entering function; detecting a starting point on the display on the basis of the detected start of the character entering function. The method of the invention comprises: detecting the direction of movement indicated by the input device when the start of the character entering function has been detected; showing the character of the character area on the display towards which character area the direction of movement indicated by the input device is proceeding; detecting the termination of the character entering function and interpreting the character towards whose character area the direction of movement was last detected to proceed as the character to be entered next, when the termination of the character entering function is detected.

The invention also relates to a user interface for entering characters in an electronic device, the user interface comprising: a display for showing the entered characters; an input device for giving control commands for entering the characters; a control unit for controlling the functions of the user interface, the control unit being connected to the display and configured to: show characters on the display; receive control commands from the input device; predetermine a given character area on the display for each character, which character areas are in relation with each other in order to achieve a given character area pattern; detect a start of a character entering function; detect a starting point on the display on the basis of the detected start of the character entering function. The control unit is further configured to: detect the direction of movement indicated by the input device, when the start of the character entering function has been detected; show the character of the character area on the display, towards which character area the direction of movement indicated by the input device is proceeding; detect the termination of the character entering function and interpret the character towards whose character area the direction of movement was last detected to proceed as the character to be entered next, when the termination of the character entering function is detected.

The invention further relates to a computer program product encoding a computer program of instructions for executing a computer process for entering characters in a user interface of an electronic device, the user interface comprising: a display and an input device, the process comprising: predetermining a given character area on the display for each character, which character areas are in relation with each other in order to achieve a given character area pattern; detecting a start of a character entering function; detecting a starting point on the display on the basis of the detected start of the character entering function, the process further comprising: detecting the direction of movement indicated by the input device when the start of the character entering function has been detected; showing the character of the character area on the display towards which character area the direction of movement indicated by the input device is proceeding; detecting the termination of the character entering function; interpreting the character towards whose character area the direction of movement was last detected to proceed as the character to be entered next, when the termination of the character entering function is detected.

The invention also relates to a user interface for entering characters in an electronic device, the user interface comprising: display means for showing the entered characters; input means for giving control commands for entering the characters; processing means for controlling the functions of the user interface, the processing means being connected to the display means and configured to: show characters on the display; receive control commands from the input means; predetermine a given character area on the display for each character, which character areas are in relation with each other in order to achieve a given character area pattern; detect a start of a character entering function; detect a starting point on the display on the basis of the detected start of the character entering function, wherein processing means further comprise: detection means for detecting the direction of movement indicated by the input device when the start of the character entering function has been detected; means for showing the character of the character area on the display towards which character area the direction of movement indicated by the input device is proceeding; means for detecting the termination of the character entering function; interpreting means for interpreting the character towards whose character area the direction of movement was last detected to proceed as the character to be entered next, when the termination of the character entering function is detected.

Preferred embodiments of the invention are described in the dependent claims.

The method and the user interface of the invention provide several advantages. In a preferred embodiment of the invention the method of entering characters is especially fast, easy and accurate. Great accuracy is not required of the users of the user interface according to the invention in order to select the right characters to be entered.

LIST OF THE DRAWINGS

Figure 2A:
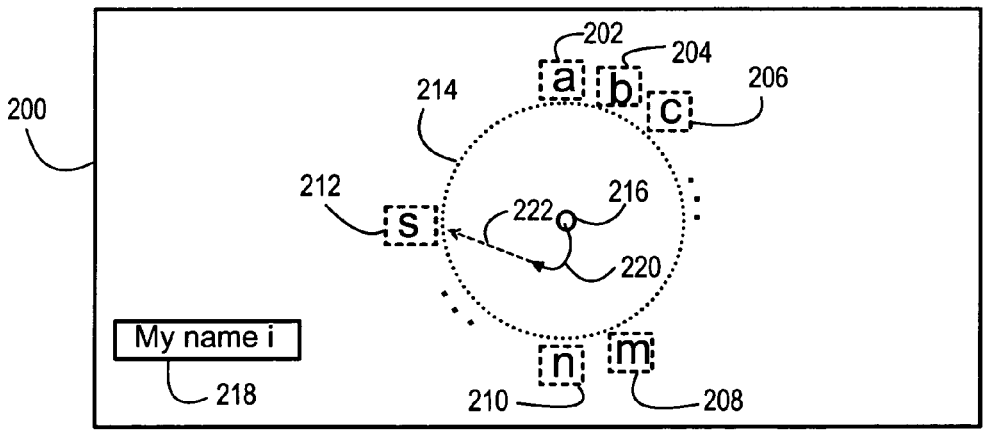
Figure 2B:
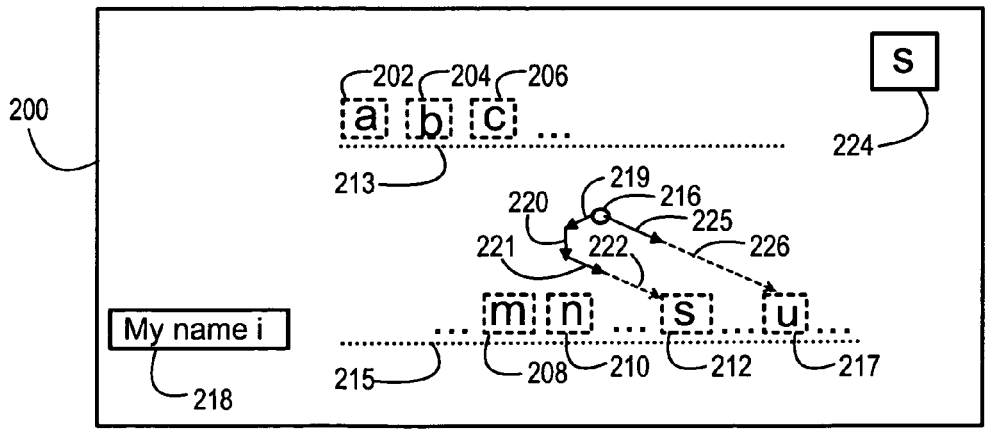
Figure 3:
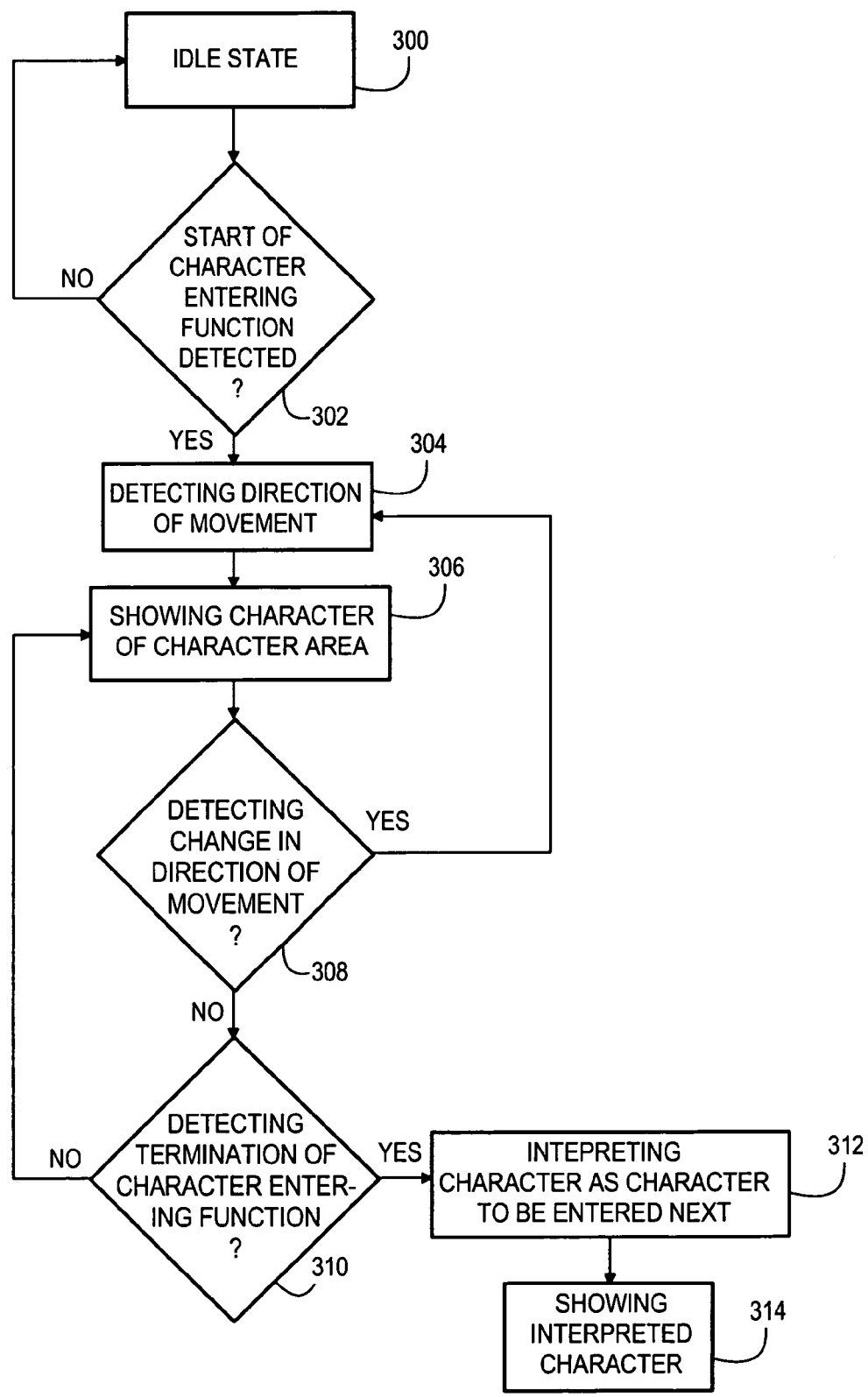
Figure 4:
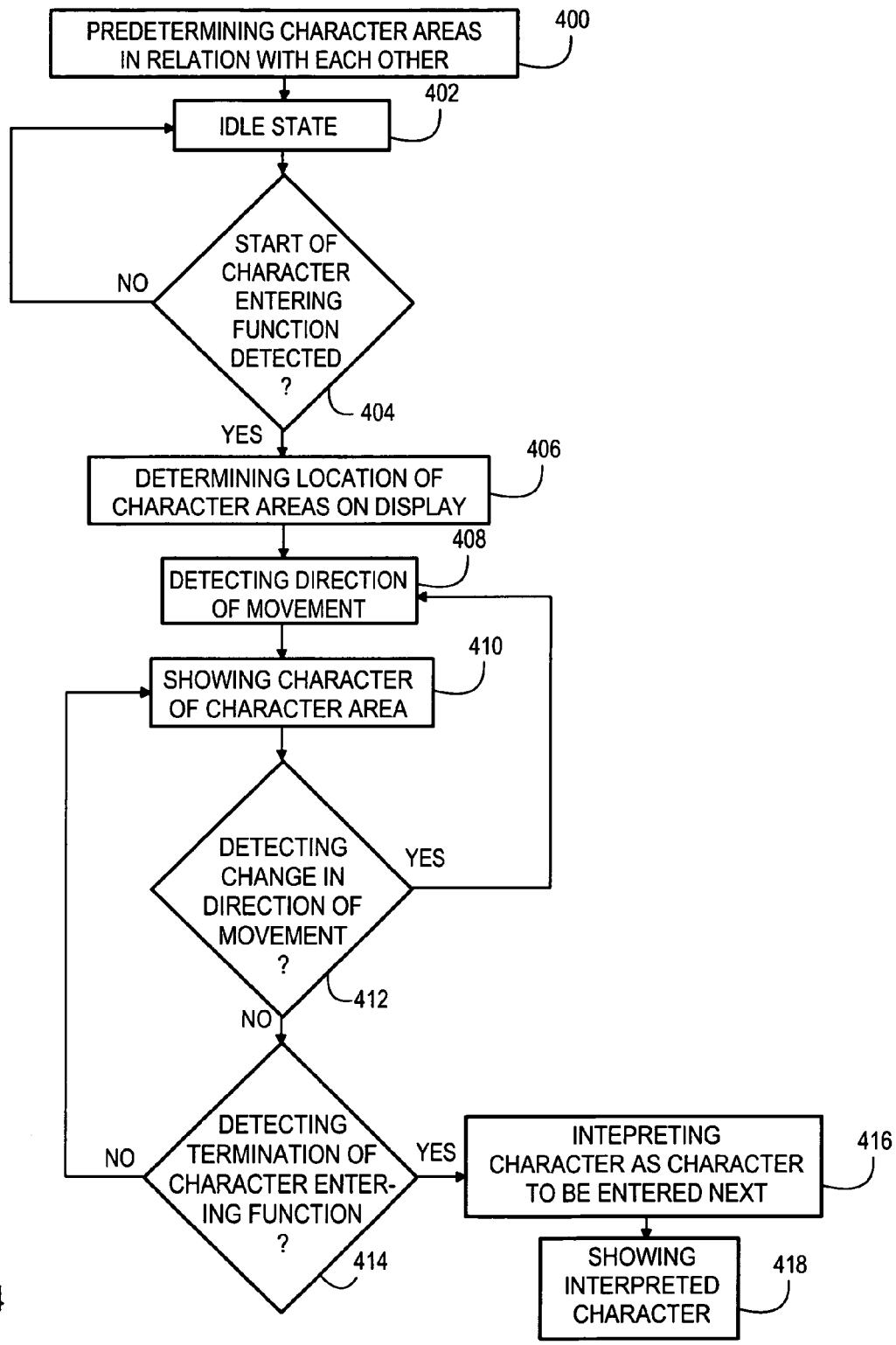

In the following, the invention will be described in greater detail with reference to the preferred embodiments and the accompanying drawings, in which FIG. 1 shows a device of the invention, FIGS. 2A and 2B show details of a display of the device of the invention, FIG. 3 is a block diagram of an embodiment of the invention, and FIG. 4 is a block diagram of another embodiment of the invention.

DESCRIPTION OF THE EMBODIMENTS

The embodiments of the invention are applicable to portable electronic devices, such as a mobile station used as a terminal in telecommunication systems comprising one or more base stations and terminals communicating with the base stations. The device may be used for short-range communication implemented with a Bluetooth chip, an infrared or WLAN connection, for example. The portable electronic device is for example a mobile telephone or another device including telecommunication means, such as a portable computer, a handheld computer or a smart telephone. The portable electronic device may be a PDA (Personal Digital Assistant) device including the necessary telecommunication means for establishing a network connection, or a PDA device that can be coupled to a mobile telephone, for instance, for a network connection. The portable electronic device may also be a computer or PDA device not including telecommunication means.

FIG. 1 shows a block diagram of the structure of a portable electronic device. A control unit 100, typically implemented by means of a microprocessor and software or separate components, controls the basic functions of the device. The user interface of the device comprises a display 104, such as a touch screen implemented by manners known per se. In addition, the user interface of the device may include a loudspeaker and a keypad part. Depending on the type of device, there may be different and a different number of user interface parts. The device of FIG. 1, such as a mobile station, also includes conventional means 108 that implement the functions of a mobile station and include speech and channel coders, modulators and RF parts. The device also comprises an antenna 110.

The functions of the device are controlled by means of an input device, such as a mouse 106, a hand-held locator operated by moving it on a surface. When using a mouse 106, for example, a sign or symbol shows the location of a mouse cursor on the display 104 and often also the function running in the device, or its state. It is also possible that the display 104 is by itself the input device achieved by means of a touch screen such that the desired functions are selected by touching the desired objects visible on the display 104. The touch on the display 104 is carried out by means of a pen or a finger, for example.

The input device 104, 106 is for giving control commands for entering the characters. The control unit 100 controls the functions of the user interface and is connected to the display 104 and configured to show characters on the display 104. The control unit 100 receives control commands from the input device 104, 106. The entered character may be one or more letters, digits, images or a combination thereof including two or more characters. It is possible that there are different functions for entering certain kinds of characters. Thus, the characters of the alphabet and the numbers, for example, have separate specific character entering functions.

The characters are entered in a character entering function controlled by the control unit 100 of the electronic device. The character entering function operates such that the desired characters visible on the display 104, for example, are first selected by means of the input device. Then, the control unit interprets the selected character as the character to be entered next and displays the character on the display 104. In an embodiment of the invention the control unit 100 detects a start of a character entering function. The start of the character entering function is detected for instance on the basis of a touch on the display 104. Alternatively, the start of the character entering function is detected by means of a start signal given with an input device 104, 106. A touch on the display 104 results in the software in the memory of the control unit 100 detecting the start of the character entering function, and after that, the control unit 100 detects a starting point on the display 104, based on the detected start of the character entering function. The starting point on the display 104 may be a touch point on the display or a point where a mouse cursor was located at the moment when the start of the character entering function was detected, for example.

According to an embodiment of the invention, the control unit is configured to predetermine a given character area on the display 104 for each entered character, such as a character of the alphabet. The character areas are in relation with each other in order to form a given character area pattern. The character areas may virtually form a certain pattern, such as a circle or a triangle, on the display 104. Other possible character area patterns are linear lines, for example. The locations of the character areas on the display 104 are based on the location of the starting point, for example. If the character areas are in relation to the starting point on the display 104, the locations of the character areas change according to the location of the starting point. During the character entering function, the characters are not visible on the display 104. It is possible, however, that the character areas are visible on the display 104. Alternatively, the character areas and/or the characters are visible on the display 104.

When the start of the character entering function has been detected, the control unit 100 detects a direction of movement indicated by the input device 104, 106. The direction of movement is detected on the basis of a direction vector between the starting point and another point on the display 104, to which other point the touch of the pen or the cursor of the mouse on the display 104 moves, for example. Next, the character of the character area on the display 104, towards which character area the direction of movement indicated by the input device 104, 106 is proceeding, is shown on the display 104. Thus, only the character of the character area, towards which character area the direction of movement is proceeding, is visible on the display 104. Alternatively, if all the characters are visible on the display, the character of the character area, towards which the direction of movement is proceeding, is shown with the help of outlining or lights, for example. The character area towards which the direction of movement is proceeding is determined in the control unit 100 by appropriate numerical methods, such as interpolation or extrapolation, known per se.

The control unit 100 continues to monitor the direction of movement indicated by the input device 104, 106. As the movement indicated by the input device 104, 106 proceeds, the direction of movement is recalculated after given periods of time. The latest direction of movement is based on a direction vector calculated by means of two points selected from the route of the movement on the display 104, the two points being at a given distance apart from each other, for example. If a change in the direction of movement is detected, then another character of the character area, towards which character area the new direction of movement is proceeding, is shown on the display 104. The direction of movement can be determined also such that after the calculation of the direction vector, the starting point on the display 104 is interpreted to be also the starting point for the direction vector. Thus, the detection of the last direction of movement is based on the location of the starting point on the display 104 as well, for example.

The control unit 100 continues to monitor the direction of movement and to show the characters until termination of the character entering function is detected. The termination of the character entering function is detected when the movement indicated by the input device stops, for example. Alternatively the termination of the character entering function is detected on the basis of a signal given with the input device. In an embodiment of the invention, the speed of the movement indicated by the input device is detected after the start of the character entering function has been detected, and the termination of the character entering function is detected when the speed of the movement indicated by the input device is of a predetermined value.

The control unit 100 interprets the character towards whose character area the direction of movement was last detected to proceed as the character to be entered next when the termination of the character entering function is detected. The entered character is shown in an area for entered characters on the display 104, for example.

If the termination of the character entering function is detected when the movement indicated by the input device stops, a given period of time can be predetermined to lapse, during which time the movement of the input device is to be on halt, before the character towards whose character area the direction of movement was last detected to proceed is shown on the display 104. Thus, if the user of the electronic device wishes to interrupt the entering of the characters, lifting the input device off the display before the given period of time has lapsed, results in exiting the character entering function without any character selection. The detection of lifting the input device off the display can be predetermined to result in other effects as well.

Let us next study embodiments of the invention by means of FIGS. 2A and 2B. FIGS. 2A and 2B show a display 200 of an electronic device, such as a PDA device. The characters are selected by means of an input device, such as a pen or a mouse. A character, in turn, is one or more letters, digits, images or a combination thereof including two or more symbols. In FIGS. 2A and 2B the characters are letters of the alphabet. When wishing to start entering characters, the user of the device first starts the character entering function by using a pen or a mouse, for example. FIGS. 2A and 2B shown a starting point 216 on the display 200, which starting point 216 is detected on the basis of the detected start of the character entering function. The user may, for example, touch the display 200 with a pen in order to start the character entering function. Then the starting point 216 is, for example, a point on the display 200 where the pen first touched. In FIGS. 2A and 2B the predetermined character areas 202, 204, 206, 208, 210, 212 on the display 200 are also shown. On the display 200 there is also an area 218 for the entered characters.

In FIG. 2A the character areas 202-212 virtually form a circle 214 around the starting point 216. A separate character area 202-212 is predetermined for each character in relation with each other and to the starting point 216, for example. Thereby, where ever on the display 200 the starting point 216 is detected to locate, the character areas 202-212 are always at the same locations on the display 200 in relation to the starting point 216. For example, in FIG. 2A the character areas 202-212 are in a circular form. The character areas 202-212 are predetermined in the settings of the electronic device by the manufacturer, for example. Alternatively, the user of the device chooses the desired character areas 202-212 by using different setting options of the device.

In order to choose a desired character to be entered, the user of the device next starts to move the pen, for example, on the display 200 towards the given character area 202-212 of the desired character. The characters to be entered are, for example, invisible on the display 200. As the user moves the pen towards a given character area 202-212, the character of the character area 202-212 towards which the movement of the pen is detected to proceed is shown on the display 200 by means of lights or outlining, for example. When the desired character is shown on the display, the user then selects the character by terminating the character entering function. The termination of the character entering function is detected when the user stops moving the pen or lifts the pen off the display 200, for example. Alternatively, the termination of the character entering function is detected when the user presses a key of the mouse, for example.

In the situation of FIG. 2A the user has already entered some characters shown in the area for entered characters 218. Next the user wishes to enter the character "s". At first the user touches the display with the pen at the starting point 216. The starting point 216 is, for example, at the point on the display that the touch of the pen hits first. Then the user starts moving the pen towards the character areas 202-212. In FIG. 2A the route 220 of the pen moving on the display 200 is also shown. At first, the pen has moved towards the character area 210. The character of the character area 210 is shown on the display 200 with lights, for example. When the user notices, on the basis of the characters shown on the display, that the movement of the pen is going to the wrong direction, he then adjusts the direction of the movement of the pen. Moving the pen towards the character area 212, which character area 212 is predetermined for the character "s", shows the character "s" on the display 200. The user only has to move the pen for as long as the desired character is shown on the display 200.

In FIG. 2A the pen is moved only a short distance on the display 200, along the route 220 of the moving pen. As soon as the character area 212 towards which the direction of movement indicated by the pen is proceeding is detected, the movement of the pen can be stopped. The last detected direction of movement, before the detection of the termination of the character entering function, is shown in FIG. 2A with a dashed arrow 222. As the user notices the desired character "s" on the display 200, he terminates the character entering function in order to enter the character "s". As the termination of the character entering function is detected, the character "s" is shown in the area 218 for entered characters. In order to enter the next character the user starts the character entering function, by touching the display 200 with a pen, for example.

If he has accidentally entered a wrong character or wishes to remove character already entered for some reason, the user may give control commands for editing the entered character. The control commands for editing are, for example, based on successive detections of sudden direction changes of movements indicated by the input device, such as the pen. The control command for removing the entered character comprises, for example, moving the pen first to the right and then moving the pen back to the left. Also other functions can be based on detections of sudden direction changes of movements indicated by the input device. Thus, for example, the entering of special characters or spaces can be accomplished by moving the input device in different directions in a predetermined fashion. The user may predetermine given successive movements of the input device to be associated to certain functions.

For a situation when the character entering function is in progress and the user wishes to stop entering characters entirely without selecting any characters, it is possible to predetermine a specific ending signal, the character entering function being interrupted once the ending signal has been detected by the control unit of the user interface. The detection of the input device moving randomly back and forth on the display, for example, can be interpreted as such an ending signal.

In FIG. 2B the areas 202-212 for the characters are linear in such a way that the character areas 202-212 are virtually forming two linear lines 213, 215 on the display 200 and on different sides of the starting point 216. Alternatively, all the character areas 202-212 can virtually form a single linear line 213, 215 on the display 200. It is possible that only a few character areas 202-212 for certain characters, such as the characters most commonly used, are located on the other side of the starting point 216 than where all the other character areas 202-212 for the other characters are located.

In an embodiment of the invention illustrated in FIG. 2B there is a character showing area 224 for showing the character of the character area 202-212 towards which the direction of movement of the input device is last detected to proceed. Additionally, the characters of the character areas 202-212 towards which the direction of movement of the input device is detected to proceed can be indicated with lights, outlining or with sounds of different tone height, for example.

Also in the situation of FIG. 2B the user has already entered some characters shown in the area for entered characters 218. Next the user wishes to enter the character "s". At first the user touches the display with the pen at the starting point 216. The starting point 216 is, for example, at the point on the display that the touch of the pen hits first. In FIG. 2B the arrow lines 219, 220, 221, 225 illustrate the different directions to which the user moves the pen at given times. The user starts moving the pen towards the character areas 202-217. First, the direction of the movement of the pen, indicated by the arrow line 219, is towards the character area 208 for the letter "m". The letter "m" of the character area 208 is shown on the display 200 when the user is moving the pen towards it. The letter "m" is shown in the character showing area 224, for example. The user notices that the movement of the pen is going in the wrong direction and he next moves the pen slightly in another direction indicated by the arrow line 220. Next the direction of the pen proceeds towards the area 210 for the letter "n". Once again, the letter towards which the movement of the pen is detected to proceed is shown on the display 200 in the character showing area 224, for example. The user then adjusts the direction of the movement of the pen a bit more until the direction, indicated by the arrow line 221, is towards the character area 212 for the letter "s". When the user moves the pen towards the character area 212 for the letter "s", the letter "s" is shown on the display 200. The last direction in which the movement of the pen is detected to proceed, before the character entering function is terminated, is indicated with the dashed arrow 222.

In FIGS. 2A and 2B the last direction of movement indicated by the pen is detected on the basis of a direction vector generated with the help of two points from the route of the movement on the display 104, the two points being at a given distance from each other, for example. In FIG. 2B, for example, the two points defining the direction vector indicated by the arrow line 221 are located at the beginning and at the end of the arrow line 221. If the last direction of movement were detected based on the starting point 216 as well, the situation in FIGS. 2A and 2B would be different in such a way that the direction vector, indicated by the arrow line 221, would then be considered to virtually start from the starting point 216. The arrow line 225 shows the new location of the direction vector, corresponding to the arrow line 221 when the direction of movement is detected based on the starting point 216 as well. Here, the direction of movement indicated by the arrow line 225 would be interpreted to proceed towards the character area 217 for the letter "u", for example. Thus, the last direction in which the movement of the pen would be detected to proceed before the character entering function is terminated is indicated with the dashed arrow 226.

Once again, the user only has to move the pen for as long as the desired letter "s" is shown on the display 200. In the situation of FIG. 2B, the letter "s" is shown on the display 200 when the pen is at the end of the arrow 221 that is proceeding towards the character area 212 for the letter "s", for example. Different limits can be preset to predetermine how long and/ or for how far the pen, for example, has to be moved in a certain direction before the character of the character area 202-217 towards which the movement of the pen is detected to proceed, is shown on the display 200. In an embodiment of the invention it is also possible that when the direction of movement of the input device is detected to change, a second character area 202-217 next to the first character area 202-217 towards which the direction of movement was first indicated to proceed, is shown on the display even before the direction of movement of the input device actually is detected to proceed exactly towards the second character area 202-217.

When satisfied with the character shown on the display 200, the user terminates the character entering function by stopping the movement of the pen, for example. As the termination of the character entering function is detected, the character "s" is shown in the area 218 for entered characters. In order to enter the next character the user starts the character entering function, by touching the display 200 with a pen, for example, or by continuing the movement of the pen after the previous character has been selected. Thus, it is possible to enter the desired characters even without lifting the pen from the display 200 between the character selections.

Let us next study an embodiment of the invention by means of FIG. 3. FIG. 3 shows a block diagram of the character entering method. A separate character area is predetermined for each character on the display, which character areas are in relation with each other. In block 300 the device is in an idle state and monitors the state of the user interface. In the idle state the start of the character entering function by touching the display of the user interface, for example, is feasible. Giving a start signal with another input device can start the character entering function as well. Such an input device may be for instance a separate keypad, provided the device comprises a keypad, and the start signal is for instance the depression of a given key or keys of the keypad. The input device may also be the display itself or a start signal area specified in the display area, the touching of which starts the character entering function.

If in block 302 the control unit detects the start of the character entering function, based for instance on a start signal given with an input device, the starting point on the display is detected and block 304 is entered, where the control unit starts detecting the direction of movement indicated by the input device. When the control unit has detected the direction of movement indicated by the input device, block 306 is entered, where the character of the character area towards which the direction of movement is directed, is shown on the display. Alternatively, the character is shown only after the direction of the movement indicated by the input device has been to the same direction for a given period of time. In an embodiment of the invention it is also possible that the most probable character area on the display towards which the direction of movement indicated by the input device is proceeding is detected in block 304, and in block 306 the character of the most probable character area on the display towards which the direction of movement indicated by the input device is proceeding is shown on the display.

In block 308 possible changes in the direction of movement is observed. If in block 308 a change in the direction of movement is detected, block 304 is re-entered, where the direction of movement is detected. If in block 308 no changes in the direction of movement are detected, block 310 is entered, where the termination of the character entering function is monitored. If in block 310 no termination of the character entering function is detected, block 306 remains, where the character of the character area towards which the direction of movement is directed, is shown on the display. When the termination of the character entering function in block 310 is detected, block 312 is entered, where the character towards whose character area the direction of movement was last detected to proceed is interpreted as the character to be entered next. Finally, in block 314 the interpreted character is shown on the display, in the area for entered characters, for example.

Let us next study another embodiment of the invention by means of FIG. 4. FIG. 4 shows a block diagram of the character entering method. In block 400 a separate character area is predetermined for each character on the display, which character areas are in relation with each other in order to achieve a given character area pattern. In block 402 the device is in an idle state and monitors the state of the user interface. If in block 404 the control unit detects the start of the character entering function, based for instance on a start signal given with an input device, the starting point on the display is detected and block 406 is entered, where the control unit determines, on the basis of the location of the starting point, the locations of the character areas on the display. Thus, where ever on the display the starting point is detected to locate, the character areas are always in relation with the starting point. The character areas may be in form of a circle around the starting point, for example.

In block 408 the control unit starts detecting the direction of movement indicated by the input device. When the control unit has detected the direction of movement indicated by the input device, block 410 is entered, where the character of the character area towards which the direction of movement is directed is shown on the display. Then, if in block 412 a change in the direction of movement is detected, block 408 is re-entered. If in block 412 no changes in the direction of movement are detected, block 414 is entered, where the termination of the character entering function is monitored. If in block 414 no termination of the character entering function is detected, block 410 remains. When the termination of the character entering function in block 414 is detected, block 416 is entered, where the character towards whose character area the direction of movement was last detected to proceed is interpreted as the character to be entered next. Finally, in block 418 the interpreted character is shown on the display, in the area for entered characters, for example.

Even though the invention is described above with reference to an example according to the accompanying drawings, it is clear that the invention is not restricted thereto but it can be modified in several ways within the scope of the appended claims.

The invention claimed is:

1. A method comprising:
predetermining a given character area on a display of a touch screen user interface of an electronic device for each character, which character areas are in relation with each other in order to achieve a given character area pattern;
detecting a start of a character entering function;
detecting a starting point on the display on the basis of the detected start of the character entering function;
detecting a direction of movement indicated by sliding an input device on the touch screen, when the start of the character entering function has been detected;
showing only the character of the character area on the display towards which character area the direction of movement indicated by the sliding input device is proceeding;
detecting the termination of the character entering function; and
interpreting the character towards whose character area the direction of movement was last detected to proceed as the character to be entered next, when the termination of the character entering function is detected.

2. The method of claim 1, wherein detecting the direction of movement further comprises detecting the most probable character area on the display towards which character area the direction of movement indicated by the input device is proceeding and showing the character further comprises showing on the display the character of the most probable character area on the display towards which character area the direction of movement indicated by the input device is proceeding.

3. The method of claim 1, the method further comprising determining, on the basis of the location of the starting point, the locations of the character areas on the display, which character areas for the characters are in form of the given character area pattern.

4. The method of claim 1, wherein detecting the start of the character entering function comprises detecting the start of the character entering function on the basis of a touch on the display.

5. The method of claim 1, wherein detecting the start of the character entering function comprises detecting the start of the character entering function on the basis of a start signal given with the input device.

6. The method of claim 1, wherein detecting the termination of the character entering function comprises detecting the termination of the character entering function when the movement indicated by the input device stops.

7. The method of claim 1, wherein detecting the termination of the character entering function comprises detecting the termination of the character entering function on the basis of a signal given with the input device.

8. The method of claim 1, the method further comprising detecting the speed of the movement indicated by the input device, when the start of the character entering function has been detected and detecting the termination of the character entering function comprises detecting the termination of the character entering function when the speed of the movement indicated by the input device is of a predetermined value.

9. The method of claim 1, the method further comprising detecting control commands for editing the entered character, based on successive detections of sudden direction changes of movements indicated by the input device.

10. The method of claim 1, wherein said character being one or more letters, digits, images or a combination thereof including two or more characters.

11. A user interface comprising:
a display for showing entered characters;
an input device implemented with a touch screen for giving control commands for entering the characters by touching the touch screen; and
a control unit for controlling the functions of the user interface, the control unit being connected to the display and configured to: show characters on the display; receive control commands from the input device; predetermine a given character area on the display for each character, which character areas are in relation with each other in order to achieve a given character area pattern; detect a start of a character entering function; detect a starting point on the display on the basis of the detected start of the character entering function;
detect a direction of movement indicated by sliding the input device when the start of the character entering function has been detected;
show only the character of the character area on the display towards which character area the direction of movement indicated by the sliding input device is proceeding;
detect the termination of the character entering function; and
interpret the character towards whose character area the direction of movement was last detected to proceed as the character to be entered next, when the termination of the character entering function is detected.

12. The user interface of claim 11, wherein the control unit is configured to detect the most probable character area on the display, towards which character area the direction of movement indicated by the input device is proceeding, and to show on the display the character of the most probable character area on the display, towards which character area the direction of movement indicated by the input device is proceeding.

13. The user interface of claim 11, wherein the control unit is configured to determine, on the basis of the location of the starting point, the locations of the character areas on the display.

14. The user interface of claim 11, wherein the control unit is configured to detect the start of the character entering function on the basis of a touch on the display.

15. The user interface of claim 11, wherein the control unit is configured to detect the start of the character entering function on the basis of a start signal given with the input device.

16. The user interface of claim 11, wherein the control unit is configured to detect the termination of the character entering function when the movement indicated by the input device stops.

17. The user interface of claim 11, wherein the control unit is configured to detect the termination of the character entering function on the basis of a signal given with the input device.

18. A computer program product encoding a computer program of instructions for executing a computer process, the process comprising:
predetermining a given character area on a display of a touch screen user interface of an electronic device for each character, which character areas are in relation with each other in order to achieve a given character area pattern;
detecting a start of a character entering function;
detecting a starting point on the display on the basis of the detected start of the character entering function;
detecting a direction of movement indicated by sliding an input device on the touch screen, when the start of the character entering function has been detected;
showing only the character of the character area on the display towards which character area the direction of movement indicated by the sliding input device is proceeding;
detecting the termination of the character entering function; and
interpreting the character towards whose character area the direction of movement was last detected to proceed as the character to be entered next, when the termination of the character entering function is detected.

19. The computer program product of claim 18, wherein the process further comprises detecting the most probable character area on the display towards which character area the direction of movement indicated by the input device is proceeding and showing on the display the character of the most probable character area on the display towards which character area the direction of movement indicated by the input device is proceeding.

20. A user interface comprising: display means for showing entered characters; a touch screen for giving control commands for entering the characters; and processing means for controlling the functions of the user interface, the processing means being connected to the display means and configured to: show characters on the display means; receive control commands from the touch screen; predetermine a given character area on the display means for each character, which character areas are in relation with each other in order to achieve a given character area pattern; detect a start of a character entering function; detect a starting point on the display means on the basis of the detected start of the character entering function, wherein processing means further comprise:
detection means for detecting the direction of movement indicated by sliding an input device on the touch screen when the start of the character entering function has been detected;
means for showing only the character of the character area on the display means towards which character area the direction of movement indicated by the sliding input device on the touch screen is proceeding;
means for detecting the termination of the character entering function;
interpreting means for interpreting the character towards whose character area the direction of movement was last detected to proceed as the character to be entered next, when the termination of the character entering function is detected.

* * * * *

UNITED STATES PATENT AND TRADEMARK OFFICE
CERTIFICATE OF CORRECTION

PATENT NO. : 7,973,770 B2  Page 1 of 1
APPLICATION NO. : 11/132479
DATED : July 5, 2011
INVENTOR(S) : Tokkonen It is certified that error appears in the above-identified patent and that said Letters Patent is hereby corrected as shown below:

On the Title Page:

Foreign Application Priority Data: "(EP) ......02102606" should read --(EP) ......02102606.7--.

Signed and Sealed this
Eighteenth Day of October, 2011

David J. Kappos
*Director of the United States Patent and Trademark Office*